A. E. & J. V. Warner,

Drag Saw.

No. 2,015. Reissued Aug. 1, 1865.

Witnesses:
W. H. Bunnings
J. Holmes.

Inventors:
A. E. Warner
J. V. Warner

AM. PHOTO-LITHO. CO. N.Y. (OSBORNE'S PROCESS.)

UNITED STATES PATENT OFFICE.

A. E. WARNER AND I. V. WARNER, OF NORWALK, OHIO.

IMPROVEMENT IN SAWING-MACHINES.

Specification forming part of Letters Patent No. 48,001, dated May 30, 1865; Reissue No. 2,045, dated August 1, 1865.

*To all whom it may concern:*

Be it known that we, A. E. WARNER and I. V. WARNER, of Norwalk, in the county of Huron and State of Ohio, have invented a certain new and useful Improvement in Sawing-Machines; and we do hereby declare that the following is a full and complete description of the construction and operation of the same, reference being had to the accompanying drawings, making a part of this specification, in which—

Figure 1:
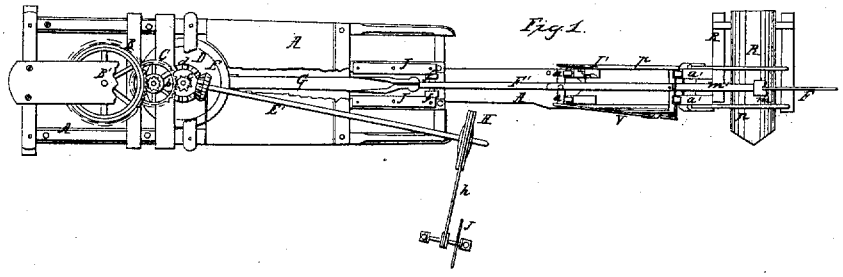
Figure 2:
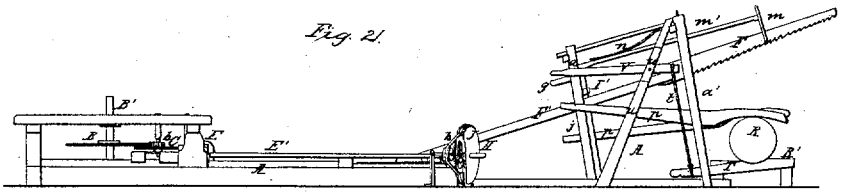
Figure 3:
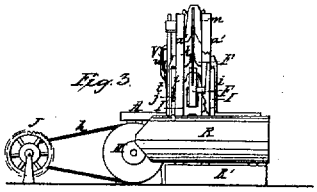
Figure 4:
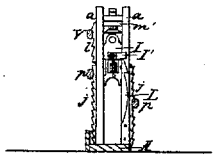

Figure 1 is a plan view of the machine. Fig. 2 is a side elevation. Fig. 3 is an end view. Fig. 4 is a sectional view.

Like letters of reference denote like parts in the several views.

The nature of our invention relates to the mode of operating both a circular and crosscut saw, either separately or jointly, by the same gearing connected with the fly-wheel or its shaft, which is less expensive, more convenient, and requires less power to operate than in the ordinary way, substantially as hereinafter set forth.

A represents the general form of the frame of the machine, which can be of any suitable construction adapted to the operating parts.

B is the driving-gear that works in a pinion, *b* on the gear-wheel C. This gear-wheel turns the fly-wheel D by means of a pinion, *c*, on its shaft.

*d* is a beveled gear, which can be either cast with or otherwise connected to the fly-wheel or its shaft, so as to gear into the beveled pinion E on the end of the shaft E′, which shaft may be placed in any practical position for operation. To the other end of this shaft is connected a wheel, H, that operates a circular saw, J, by means of the belt *h* in the ordinary manner. The wheel H is turned by the revolution of the fly-wheel D, turning the shaft E′ by the beveled gears E and *d*.

The crosscut-saw F is operated by means of a connecting-rod, G, (seen in Fig. 1,) that is attached to the fly-wheel D at one end, the other end being jointed to the pitman F′ of the saw.

*f f* is the cross head, secured to the pitman, and moves on the guides J′ J′ in the ordinary way, insuring a straight vibrating motion of the saw.

Between the inclined standards *a* of the frame there is a slide, I, (represented in Figs. 3 and 4,) the side edges of which fit in grooves in the standards, that keep it in place as it is moved up or down. Through an opening in this slide (seen in Fig. 4) the pitman of the saw passes, by which it is supported in its inclined position. To the slide I is secured a catch, I′, that rests on notches on one side of a spring, L, as represented, by which the slide can be readily adjusted to any desired position. By drawing out the spring the catch is released, when the slide can be moved either way by a handle, *g*, projecting behind, (seen in Fig. 2,) and a notch above or below, allowed to spring under the catch, firmly retaining the slide in place.

The saw passes through a guide, *k*, in the front standard, *a′*, that slides in grooves in the standards. The saw-guide *m*, by means of the arm *m′*, is pivoted or hung to the back standard, *a*.

*n* is a spring that presses on the arm *m′* of the guide.

*p p* are clamp-levers resting on the log R, that pass through slots or guides *i i* in the front of the frame, and are adjusted and held in any desired position by means of the ratchets *j* on the standards *a*, in which the back ends of the levers catch.

R′ is a frame supporting the log, one end or cross-piece, T, of which can be raised or lowered by a rope, *t*, or its equivalent, attached to it and connecting it to a lever, V, which passes through a guide, *u*, in a standard, *u′*, and is secured in any position by a ratchet or rack, *l*. The adjustable support T and clamp-lever *p*, together with the rest of the supporting-frame, hold the log firmly in place while it is being sawed, and the saw is adjusted in relation to the log by means of the slide I, as before described.

The horse-power is connected to the driving-shaft B, which revolves the gear-wheels turning the fly-wheel D, that operates the circular saw by means of the beveled gearing *d* and E, shaft E′, and wheel H, as before stated, at the same time, by means of the connecting-rod G, the crosscut-saw is vibrated. Thus both saws are operated simultaneously by the same power, or separately by throwing one or the other out of gear by any suitable device.

We are aware that different saws have been operated by the same horse-power. Therefore we do not broadly claim the combination of a horse-power with two saws; but what distinguishes our invention from others is the employment or use of a bevel gear-wheel cast with or otherwise connected to the fly-wheel or its shaft for the purpose of operating the circular and crosscut saws, either separately or together, thereby saving expense and labor and rendering the machine more convenient, and operating with less friction than in the ordinary way.

Having thus fully described our invention, what we claim, and desire to secure by Letters Patent of the United States, is—

The above-described arrangement of operating a circular saw, in combination with a crosscut-saw or separately, substantially as and for the purpose set forth.

A. E. WARNER.
I. V. WARNER.

Witnesses:
C. W. VAN HORN,
E. A. PRAY.